(12) United States Patent
Ladd et al.

(10) Patent No.: US 6,339,119 B1
(45) Date of Patent: Jan. 15, 2002

(54) SCORCH RETARDING GOLF BALL COMPOSITION

(75) Inventors: Derek A. Ladd, New Bedford, MA (US); Steven M. Gosetti, Providence, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 09/425,755

(22) Filed: Oct. 22, 1999

(51) Int. Cl.[7] .......................... A63B 37/06; C08K 5/08; C08K 5/13; C08K 5/07
(52) U.S. Cl. ................... 524/336; 524/358; 524/360; 524/347; 524/343; 525/264; 525/274; 525/257; 473/372; 473/373; 473/374; 473/377
(58) Field of Search ................... 525/257, 264, 525/274; 524/336, 343, 347, 358, 360; 473/372, 373, 374, 377

(56) References Cited

U.S. PATENT DOCUMENTS

| | | | |
|---|---|---|---|
| 4,692,497 A | | 9/1987 | Gendreau et al. |
| 5,184,828 A | * | 2/1993 | Kim |
| 6,120,390 A | * | 9/2000 | Dalton |

FOREIGN PATENT DOCUMENTS

| | | | |
|---|---|---|---|
| EP | 487397 | * | 5/1992 |
| JP | 113475 | * | 5/1986 |

OTHER PUBLICATIONS

L.H. Palys et al., "Crosslinking Elastomers with Improved Productivity Using Novel Scorch Resistant Peroxide Formulations", Paper 119, Amer. Chem. Soc. 144th Rubber Division Meeting, Orlando, Florida, Oct. 26–29, 1993, pp. 1–81.

* cited by examiner

Primary Examiner—David J. Buttner

(57) ABSTRACT

The present invention is directed to a golf ball containing a cover layer and a core layer, where the core layer is molded from a scorch retarding composition comprising a scorch retarding peroxide, an elastomeric polymer and a cross-linking agent. Preferably, the scorch retarding peroxide is present in an amount sufficient to delay cross-linking of the elastomeric polymer during core layer formation for a time sufficient to substantially prevent backrinding on the molded core layer. The golf balls of the invention may further comprise at least one intermediate layer interposed between the cover layer and the core layer, at least one of the layers being molded from a scorch retarding composition comprising a scorch retarding peroxide, an elastomeric polymer and a cross-linking agent. A method of making such golf balls is also disclosed.

34 Claims, No Drawings

SCORCH RETARDING GOLF BALL COMPOSITION

FIELD OF THE INVENTION

This invention generally relates to golf balls, and, in particular, is directed to a composition used for the manufacture of golf ball cores, as well as a method for the manufacture of golf ball cores using the subject composition.

BACKGROUND OF THE INVENTION

Today, a wide variety of golf balls are available to meet the needs and desires of a wide range of golfers. Golf balls are generally available as one-piece (i.e., unitary), two-piece, and three-piece (i.e., wound or solid multi-component) balls. One-piece balls lack a separate cover, and are typically formed with a dimpled surface from a molded polybutadiene based compound. Since these balls typically spin at a high rate, and have a low velocity, they travel a relatively short distance when struck and are generally used as practice or driving range balls.

In contrast, two-piece golf balls, used by the typical amateur golfer, provide maximum durability and distance. These balls usually have a core formed of a single solid sphere, which is typically formed of a polybutadiene based compound, and a cover of SURLYN® or other similar ethylene-based ionomer that encloses the core.

Three-piece balls, which are preferred by professionals and low handicap amateur golfers for their spin characteristics and feel, include either a solid rubber core or a liquid center core that may be wound with many meters of elastic windings. Such cores are thereafter encased in a cover formed of SURLYN®, polyurethane or balata rubber. The winding provides three-piece balls with a higher spin rate and more control for better golfers.

Regardless of the form of the ball, for obvious reasons players generally seek a golf ball that has good durability. All golf balls, whether the covers are formed from ionomers, balata or some other cover composition, typically exhibit failures such as cuts, cracks or other fractures which appear in the outer surface of the cover of a golf ball after it is repeatedly struck with a club. Failures may appear anywhere in the cover and are either the result of a defect or occur towards the end of the useful life of the golf ball. Although the durability of ionomer resin covered golf balls varies depending upon the particular composition of the cover blend, conventional golf balls having ethylene-based ionomer resin covers (with a typical cover hardness of 65–70 Shore D) are generally expected to have a long useful life before the golf ball fails. Therefore, golf ball manufacturers seek to discover compositions that provide durable golf balls that deliver the maximum performance for golfers of all skill levels.

A number of elastomeric polymers, such as polybutadiene, natural rubber, styrene butadiene rubber (hereafter "SBR") and polyisoprene, have been used in fabricating golf ball cores. Today, golf ball cores are predominantly made of polybutadiene. Moreover, in order to obtain the desired physical properties for golf balls, manufacturers have added a cross-linking agent, also known as a coagent, such as a metallic salt of an unsaturated carboxylic acid. The amount of cross-linking agent or coagent added is typically about 8 to about 60 parts per hundred parts of elastomeric polymer by weight (parts per hundred, hereafter "pph"). Most commonly, an acrylate neutralized with a metal ion, such as zinc diacrylate or zinc dimethacrylate, is used for this purpose.

In commercially available golf balls, a conventional peroxide is generally used to cross-link the elastomeric polymer during, e.g., the core molding process. The peroxide decomposes to form radicals which initiate cross-linking, as is well known to those of ordinary skill in this art. For example, typical peroxide compounds taught to initiate cross-linking of the elastomeric polymer/cross-linking agent include dicumyl peroxide (available as PEROXIMON DC 400KEP® from Elf Atochem N.A. and ESPERAL 115RG® from Witco), 1,1-di(t-butylperoxy)-3,3,5-trimethylcyclohexane (VAROX 231XL® from R.T. Vanderbilt, LUPERCO 231KE® from Elf Atochem N.A.), α,α'-bis(t-butylperoxy)-diisopropylbenzene (RETILOX F40KEP® from Elf Atochem N.A.), 2,5-dimethyl-2,5-di(t-butylperoxy)hexane (VAROX DBPH-50® from R.T. Vanderbilt, LUPERCO 101-XL® from Elf Atochem N.A.) and di(t-butyl) peroxide (from Witco).

Typically, about 5 to 50 pph of a particulate material, such as zinc oxide (ZnO), tin oxide (SnO), calcium oxide (CaO), or mixtures thereof, is also added to the composition. This particulate material may serve as both a filler and an activation agent for the cross-linker/peroxide cure system. For example, if comparable compositions with and without zinc oxide are compared, there is a reduction in cure enhancement for the composition lacking zinc oxide which results in less cross-linking and a corresponding reduction in compression and velocity. The high specific gravity of the particulate material, e.g., 5.57 for ZnO, can serve the dual purposes of adjusting the weight of the golf ball in addition to acting as an activation agent.

U.S. Pat. No. 4,546,980 to Gendreau et al. discloses a more recent development in cross-linking golf ball core compositions—the use of two free radical initiators, each with a substantially different reactivity or half-life at the same temperature, to yield golf balls with excellent durability and high initial velocity. This reference discloses the use of two initiators to cure the core composition, the half-life of one initiator being preferably three times longer than the other initiator and, more preferably, six times longer.

However, a difficulty encountered in all of the prior art cross-linking of elastomeric polymers with peroxides or mixed peroxides is the rapid increase in viscosity caused by the increase in polymer molecular weight which occurs during cross-linking. When the viscosity becomes too high, the partially cross-linked polymer cannot flow rapidly and does not completely fill the mold containing it. This phenomenon, known as scorch, results from premature cross-linking which may occur during compounding or manufacturing.

Scorch is accentuated by processing conditions that include high temperatures and/or high shear rates. For example, in an injection molding process, the elastomeric polymer and peroxide composition must be exposed to high shear rates as the composition flows rapidly through the injection nozzle, runners and gates on its pathway to the mold and to high temperatures, which are required to keep the composition fluid until it reaches the mold. If scorch occurs, the surface of the resulting molded object, e.g., a golf ball core, will be irregular and the composition may solidify in the runners leading to the mold, thereby unfavorably impacting the efficiency, scrap rate and safety of the process. High shear rates combined with high temperatures also occur in other common golf ball composition processing methods, such as in roll milling and extrusion.

One way to minimize scorch, i.e., increase the time to the onset of scorch, or scorch time, is to increase the half-life, i.e., decrease the rate of decomposition, of the peroxide initiator by lowering the temperature or by choosing a peroxide with a different chemical structure. However, this approach is generally unsatisfactory since longer half-lives result in a slower rate of cross-linking and unsatisfactory long cure times in the mold.

Moreover, a short scorch time increases the occurrence of backrinding. Backrinding describes the undesirable torn or gouged appearance of cross-linked articles at a mold parting line. Backrinding is caused by the continuing thermal expansion of an elastomeric polymer at the parting line in a mold after cross-linking occurs. This expansion forces cross-linked polymer into the opening at the parting line and causes the cross-linked polymer to rupture. Additionally, when a material that is being cross-linked is compressed under high pressures and forced to elongate and flow, backrinding is evidenced as the ripping and breaking occurring along molding seam.

Both molded part geometry and elastomeric polymer composition are known to influence backrinding. In particular, backrinding becomes more severe as the surface area to mass ratio decreases for a molded part. Therefore, backrinding is the most severe for a sphere, such as a golf ball core, where this ratio is at a minimum.

While not wishing to be limited by any particular theory, the physical manifestations of backrinding, e.g., gouges at the mold parting line, are thought to contribute to premature failure of golf balls by making the golf ball more nonuniform, by causing a concentration of stress at the gouge, by serving as a site for the initiation of cracking, or by a combination of these mechanisms. Thus, it is desirable to reduce backrinding in golf ball compositions to improve the quality of golf ball components molded therefrom and to enhance golf ball durability. By increasing the scorch time, the elastomeric polymer is able to elongate and flow before cross-linking and, thus, backrinding is minimized.

Recently, so-called scorch retarding or scorch resistant peroxides have become available. Incorporating a scorch retarding peroxide into an elastomeric polymer composition slows the onset of cross-linking. Although not wishing to be limited by any particular theory, scorch retarding peroxides are believed to comprise free radical "scavengers" which react with the peroxide radicals as soon as they are formed from the thermal decomposition of the peroxide. Reaction with the scavenger prevents the peroxide radicals from immediately initiating cross-linking of the composition. Thus, the composition does not start to cross-link until these scavengers are consumed. Therefore, the greater the concentration and/or efficiency of the scavenger in the composition, the longer the onset of cross-linking is delayed, thereby increasing the scorch time. However, once the scavenger is consumed, cross-linking takes place at substantially the same rate as would occur for a composition comprising the same peroxide present in a non-scorch retarding form. A disadvantage of the scorch retarding peroxides is that more peroxide is required to cross-link the composition since the scavenger, until it is consumed, destroys peroxide radicals.

The use of scorch retarding peroxides to cross-link ethylene-propylene-diene rubber (hereafter "EPDM") and ethylene-propylene rubber is disclosed by L. H. Palys et al. ("Crosslinking Elastomers with Improved Productivity Using Novel Scorch Resistant Peroxide Formulations", Paper 119, Amer. Chem. Soc. 144th Rubber Division Meeting, Orlando, Fla., Oct. 26–29, 1993). However, this reference does not disclose the crosslinking of other unsaturated elastomeric polymers, such as polybutadiene, natural rubber, balata, gutta-percha, synthetic polyisoprene, SBR, etc., with scorch retarding peroxides. Furthermore, this reference does not disclose or even suggest that any scorch retarding composition may be used in a golf ball. Additionally, the scorch time disclosed by the reference is related only to an arbitrary increase in torque, either 0.4 or 1.0 in-lb above the base-line torque level, of a composition which is cross-linked in a measuring device. Therefore, the scorch times disclosed by this reference are totally divorced from the final properties of the cross-linked material and the time at which they are realized. Moreover, this reference, taking no notice of backrinding, does not disclose or even suggest that minimization of backrinding is a desirable attribute of a scorch retarding golf ball composition.

Therefore, it would be advantageous to provide a golf ball composition, particularly for core and intermediate layers, with longer scorch time for ease of processing and improved process safety and that imparts the good durability properties to golf balls so desired by golfers. The present invention provides such a golf ball composition.

SUMMARY OF THE INVENTION

One embodiment of the present invention is a golf ball containing a cover layer, a core layer, and, optionally, at least one intermediate layer interposed between the cover layer and the core layer, where at least one layer is molded from a scorch retarding composition, the composition comprising a scorch retarding peroxide, an elastomeric polymer and a cross-linking agent. The cover layer, the core layer, and/or at least one intermediate layer may be molded of the scorch retarding composition. Preferably, the scorch retarding peroxide is present in the at least one layer molded from the scorch retarding composition in an amount sufficient to delay cross-linking of the elastomeric polymer during formation of the at least one layer for a time sufficient to substantially prevent backrinding therein.

Preferably, the scorch retarding peroxide contains a compound selected from the group consisting of α,α'-bis(t-butylperoxy)-diisopropylbenzene, dicumyl peroxide, n-butyl-4,4-di(t-butylperoxy)-valerate, 1,1-di(t-butylperoxy)-3,3,5-trimethylcyclohexane, 2,5-dimethyl-2,5-di(t-butylperoxy)hexane, and mixtures thereof. More preferably, the scorch retarding peroxide contains a compound selected from the group consisting of α,α'-bis(t-butylperoxy)-diisopropylbenzene, dicumyl peroxide, 2,5-dimethyl-2,5-di(t-butylperoxy)hexane, and mixtures thereof. Preferably, the amount of the scorch retarding peroxide in the composition is from about 0.05 parts to about 6.0 parts per 100 parts of said elastomeric polymer by weight. More preferably, the amount of the scorch retarding peroxide in the composition is from about 0.05 parts to about 2.5 parts per 100 parts of the elastomeric polymer by weight and, even more preferably, from about 0.15 parts to about 2 parts per 100 parts of the elastomeric polymer by weight.

Typically, the scorch retarding peroxide contains a free radical scavenger selected from the group consisting of benzoquinones, hydroquinones, phenols, benzaldehydes, cyclohexadiene-1-ones, and mixtures thereof. Preferably, the scorch retarding peroxide contains a compound selected from the group consisting of 2,3,5,6-tetramethylbenzoquinone, 2-t-butylhydroquinone, 2,2'-methylene-bis(4-methyl-6-t-butylphenol), 2,6-di-t-butyl-4-hydroxybenzaldehyde, 2,6-di-t-butyl-4-methylene-2,5-cyclohexane-1-one, and mixtures thereof. More preferably, the scorch retarding peroxide contains a compound selected from the group consisting of 2,3,5,6-tetramethylbenzoquinone, 2-t-butylhydroquinone, 2,2'-methylene-bis(4-methyl-6-t-butylphenol), and mixtures thereof. Preferably, the amount of the free radical scavenger in the scorch retarding peroxide is from about 0.01 parts to about 2 parts per 100 parts of the peroxide by weight. Even more preferably, the amount of the free radical scavenger in the scorch retarding peroxide is from about 0.1 parts to about 1.3 parts per 100 parts of the peroxide by weight.

Preferably, the elastomeric polymer comprises polybutadiene. Preferably, the polybutadiene has a cis-1,4-polybutadiene content of at least about 80% and, more preferably, has a cis-1,4-polybutadiene content of at least about 90%.

Preferably, the cross-linking agent is a metal salt of a material selected from the group consisting of mono-(meth)acrylic acid, di-(meth)acrylic acid, and mixtures thereof. Even more preferably, the metal salt is zinc diacrylate. Preferably, the metal salt in the composition is present in an amount of from about 8 parts to about 60 parts per 100 parts of the elastomeric polymer by weight. More preferably, the amount of the metal salt in the composition is from about 10 parts to about 40 parts per 100 parts of the elastomeric polymer by weight.

If desired, the composition may further contain a particulate material selected from the group consisting of zinc oxide, tin oxide, calcium oxide, barium sulfate, regrind, and mixtures thereof.

Another embodiment of the invention is a golf ball comprising a cover, a core and, optionally, at least one intermediate layer interposed between the cover and the core, where the core is formed from a scorch retarding composition. The composition contains an elastomeric polymer comprising polybutadiene, from about 0.05 parts to about 6.0 parts per 100 parts of the elastomeric polymer by weight of a scorch retarding peroxide selected from the group consisting of α,α'-bis(t-butylperoxy)-diisopropylbenzene, dicumyl peroxide, 2,5-dimethyl-2,5-di(t-butylperoxy)hexane, and mixtures thereof, and a cross-linking agent comprising a metal salt of a material selected from the group consisting of mono-(meth)acrylic acid, di-(meth)acrylic acid, and mixtures thereof. Preferably, the scorch retarding peroxide is present in the composition in an amount of from about 0.05 parts to about 2.5 parts per 100 parts of the elastomeric polymer by weight and, more preferably, from about 0.15 parts to about 2 parts per 100 parts of the elastomeric polymer by weight. Preferably, the polybutadiene has a cis-1,4-polybutadiene content of at least about 90% and the metal salt is zinc diacrylate.

A further embodiment of the invention is a method of manufacturing a golf ball having improved resistance to backrinding, the golf ball comprising a cover layer, a core layer, and, optionally, at least one intermediate layer interposed between the cover layer and the core layer, which method comprises:

forming a first mixture comprising an elastomeric polymer and from about 8 parts to about 60 parts per 100 parts of the elastomeric polymer by weight of a cross-linking agent comprising a metal salt of a material selected from the group consisting of mono-(meth)acrylic acid, di-(meth)acrylic acid, and mixtures thereof, where the elastomeric polymer comprises polybutadiene;

combining from about 0.05 parts to about 6.0 parts per 100 parts of the elastomeric polymer by weight of at least one scorch retarding peroxide with the first mixture to form a scorch retarding golf ball composition; and forming at least one layer of a golf ball from the composition.

Typically, the first mixture is formed with the cross-linking agent in an amount of from about 10 parts to about 40 parts per 100 parts of the elastomeric polymer by weight. The method may further comprise forming the first mixture with polybutadiene having a cis-1,4-polybutadiene content of at least about 90%. Preferably, the scorch retarding peroxide is added to the first mixture in an amount of from about 0.05 parts to about 2.5 parts per 100 parts of the elastomeric polymer by weight and comprises a compound selected from the group consisting of α,α'-bis(t-butylperoxy)-diisopropylbenzene, dicumyl peroxide, n-butyl-4,4-di(t-butylperoxy)-valerate, 1,1-di(t-butylperoxy)-3,3,5-trimethylcyclohexane, 2,5-dimethyl-2,5-di(t-butylperoxy)hexane, and mixtures thereof.

The method may further comprise forming the scorch retarding golf ball composition from a scorch retarding peroxide comprising a free radical scavenger, forming the first mixture with zinc diacrylate as the metal salt, and/or adding to the first mixture a particulate material selected from the group consisting of zinc oxide, tin oxide, calcium oxide, barium sulfate, regrind, and mixtures thereof.

An additional embodiment of the invention is a golf ball core layer and/or intermediate layer produced according to the above-described method.

A further additional embodiment of the invention is a golf ball comprising a core layer and/or an intermediate layer formed according to the above-described method.

An alternate embodiment of the invention is a method comprising molding the scorch retarding golf ball composition into a unitary golf ball.

DETAILED DESCRIPTION OF THE INVENTION

The present invention is directed to methods and compositions for use in the manufacture of golf balls and, particularly, golf ball cores. Preferably, compositions and methods of the present invention are directed to the innermost golf ball core layer. However, the compositions may also be used to form covers, intermediate layers, the outer layer of so-called dual cores, i.e., two-layer cores, or any layer of multilayer cores, i.e., two or more layer cores, and even one-piece golf balls if desired.

As used herein, an "intermediate layer" is an independent layer between a cover and a core. Such an intermediate layer may be distinguished from a cover or a core by some difference in the materials comprising the layers. An intermediate layer may, for example, have a distinct composition, a different proportion of components, a different molecular weight of a component, a different molecular weight distribution of a component, or a different degree of cross-linking when compared to the corresponding attribute of the component comprising the adjacent cover or core layer. optionally, an intermediate layer may be a wound layer, i.e., comprise the windings of a wound golf ball, e.g., wherein a liquid or solid center is wrapped in elastomeric windings, as known to those skilled in the golf ball art. A "cover" or a "core", as these terms are used herein, may comprise a single layer or a plurality of layers. An intermediate layer may be used, if desired, with a dual or a multilayer cover or a dual or a multilayer core, or with both a multilayer cover and a multilayer core. Therefore, an intermediate layer is also sometimes referred to in the art as an inner cover layer, as an outer core layer or as a mantle layer.

Although the scorch retarding compositions of the present invention may be present in any layer, they are preferably present in at least one layer selected from a core layer and an intermediate layer. More preferably, the compositions of the invention are present in the core layer.

The present invention is directed to golf balls comprising at least a cover layer and a core layer, wherein at least one of the layers is formed from a scorch retarding composition comprising a scorch retarding peroxide, an elastomeric polymer and a cross-linking agent.

The peroxide component of the scorch retarding composition of the invention comprises a peroxide which has been suitably modified to extend the onset of scorch, i.e., to increase its scorch time.

While not wishing to be limited by any particular theory, as discussed above, it is believed that scorch retarding peroxides derive their effectiveness in retarding scorch by comprising at least one free radical scavenger present along with the peroxide. Free radical scavengers are well known to those of ordinary skill in the art. Such scavengers may include, but are not limited to, benzoquinones, such as 2,3,5,6-tetramethylbenzoquinone, hydroquinones, such as 2-t-butylhydroquinone, phenols, such as 2,2'-methylene-bis (4-methyl-6-t-butylphenol), benzaldehydes, such as 2,6-di-t-butyl-4-hydroxybenzaldehyde, and cyclohexadiene-l-ones, such as 2,6-di-t-butyl-4-methylene-2,5-cyclohexane-1-one. Preferred free radical scavengers include 2,3,5,6-tetramethylbenzoquinone, 2-t-butylhydroquinone, 2,2'-methylene-bis(4-methyl-6-t-butylphenol), and mixtures thereof.

Therefore, the scope of the present invention encompasses the use of any scorch retarding free radical initiator obtained by combining at least one free radical initiator with an effective amount of at least one free radical scavenger, and using the combination to form a scorch retarding golf ball composition. These components may be mixed before the combination is added to the composition, or the free radical initiator and the free radical scavenger may be added, separately or together, to the composition.

Thus, one embodiment of the present invention provides a method of manufacturing scorch retarding golf ball compositions comprising adding at least one conventional peroxide and an effective amount of at least one free radical scavenger to the composition. Furthermore, the scorch retarding golf ball compositions formed thereby are within the scope of the present invention.

Peroxides useful for forming the compositions of the invention include but are not limited to those which comprise dicumyl peroxide, n-butyl-4,4-di(t-butylperoxy)-valerate, 1,1-di(t-butylperoxy)-3,3,5-trimethylcyclohexane, α,α'-bis(t-butylperoxy)-diisopropylbenzene, 2,5-dimethyl-2,5-di(t-butylperoxy)hexane, and mixtures thereof. Preferred peroxides for forming the compositions of the invention include those which comprise α,α'-bis(t-butylperoxy)-diisopropylbenzene, dicumyl peroxide, 2,5-dimethyl-2,5-di (t-butylperoxy)hexane, and mixtures thereof.

Commercial scorch retarding peroxides which are useful for forming the compositions of the invention include but are not limited to VAROX DCP-R®, VAROX DCP-40KE-HP®, VAROX 802-40KE-HP®, and VAROX DBPH-50-HP®, all from R.T. Vanderbilt, and PEROXIMON DC 400KEP-SR®, LUPERCO 230XL-SR®, LUPERCO 231KE-SR®, RETILOX F40KEP-SR®, and LUPERCO 101-XL-SR®, all from Elf Atochem N.A. Preferred scorch retarding peroxides for forming the compositions of the invention include VAROX DCP-R®, VAROX DCP-40KE-HP®, VAROX DBPH-50-HP®, and VAROX 802-40KE-HP® and their commercial equivalents available from other suppliers. The most preferred scorch retarding peroxide is VAROX 802-40KE-HP®.

In an alternate embodiment of the present invention, a scorch retarding golf ball composition may be formed by adding to a composition comprising an elastomeric polymer, a cross-linking agent and a particulate material (as defined below), which is used to adjust the density and/or assist the cross-linking reactions, a peroxide, such as α,α'-bis(t-butylperoxy)-diisopropylbenzene, and an effective amount of a free radical scavenger, such as a mixture of 2-t-butylhydroquinone and 2,2'-methylene-bis(4-methyl-6-t-butylphenol). The peroxide and scavenger may be mixed and the mixture added to the composition, or the peroxide and scavenger may be added, together or separately, to the composition.

Preferably, the amount of the free radical scavenger present with the peroxide is from about 0.01 to about 2 parts per 100 parts of the peroxide by weight. More preferably, the amount of the free radical scavenger present with the peroxide is from about 0.05 to about 1.5 parts per 100 parts of the peroxide by weight. Most preferably, the amount of the free radical scavenger present with the peroxide is from about 0.1 to about 1.3 parts per 100 parts of the peroxide by weight.

The elastomeric polymer component of the scorch retarding composition of the invention preferably comprises a diene monomer, e.g., butadiene or 2,11-dodecadiene. More preferably, the elastomeric polymer is formed from a 1,3-diene monomer, e.g., butadiene, isoprene or chloroprene. Even more preferably, the elastomeric polymer is formed from at least 40 parts by weight of butadiene. Most preferably, the elastomeric polymer is formed essentially from butadiene.

Preferred elastomeric polymers that may be used in the scorch retarding compositions of the invention include but are not limited to polybutadiene, natural rubber, balata, gutta-percha, synthetic polyisoprene, SBR and EPDM. More preferably, the elastomeric polymer comprises at least 40 parts by weight of polybutadiene. Most preferably, the elastomeric polymer consists essentially of polybutadiene. The polybutadiene preferably has a cis-1,4 content above about 40%, more preferably, above about 80% and, most preferably, above about 90%.

Commercial sources of polybutadiene include SHELL 1220® manufactured by Shell Chemical, NEOCIS BR40® manufactured by Enichem Elastomers and UBEPOL BR150® manufactured by Ube Industries, Ltd. When a composition comprising polybutadiene is desired, it is preferred that a portion of the polybutadiene comprise NEOCIS BR40® because this polybutadiene is believed to improve processing in mixtures comprising additives when it is a component of these mixtures. If desired, the polybutadiene can also be mixed with other elastomers known in the art, such as any of the above elastomeric polymers and, in particular, natural rubber, balata, SBR and/or synthetic polyisoprene, in order to further modify the properties of the desired product.

The cross-linking agent or co-agent suitable for use in the scorch retarding compositions of the scorch retarding compositions of the invention may be formed from unsaturated carboxylic acids. Preferably, such agents are formed from the salts of α,β-ethylenically unsaturated carboxylic acids having 3 to 8 carbon atoms, such as methacrylic, acrylic, cinnamic and crotonic acids. Suitable counterions include but are not limited to quaternary phosphonium or ammonium cations, such as tetraalkyl phosphonium, and metal cations, such as sodium, lithium, potassium, magnesium, calcium, zinc, barium, aluminum, tin, zirconium, nickel and cadmium. Zinc, sodium and magnesium are preferred as metal cations.

Other cross-linking agents may comprise a compound with vinyl unsaturation. For example, cross-linking agents with vinyl unsaturation that may be used in the scorch retarding compositions of the invention include but are not limited to N,N'-m-phenylene dimaleimide (available as VANAX MBM® from R.T. Vanderbilt), trimethylolpropane trimethacrylate (SARTOMER SR-350® from Sartomer), triallyl trimellitate (TRIAM 705® from Wako Chemicals), triallylisocyanurate (TAIC® from Nippon Kasei Chemical), and acrylate terminated liquid polybutadiene (POLY BD 300® from Elf Atochem N.A.).

More preferably, the cross-linking agent is a mono-(meth) acrylic acid or di-(meth)acrylic acid metal salt, wherein the cation is zinc, sodium, magnesium, or mixtures thereof. As used herein, the term "(meth)acrylic" includes both methacrylic and acrylic. Even more preferably, the cross-linking agent is zinc diacrylate, zinc dimethacrylate, or mixtures thereof. Of the common acrylate cross-linkers, zinc diacrylate has generally been found to produce golf balls with greater initial velocity than zinc dimethacrylate, therefore, the former is most preferred. Suitable, commercial sources for zinc diacrylate include Rockland React-Rite and Sartomer.

A representative base composition for forming the scorch retarding golf ball compositions prepared in accordance with the present invention comprises polybutadiene and, in parts by weight based on 100 parts polybutadiene, 8–60 parts of at least one cross-linking agent which is preferably a metal salt of a mono-(meth)acrylate or di-(meth)acrylate, more preferably zinc diacrylate, and 0.05–6.0 parts of a scorch retarding peroxide. When a mixture of elastomeric polymers is used, the amounts of other constituents in the composition are based on 100 parts by weight of the total elastomeric polymer mixture.

The scorch retarding peroxide(s) at 100% purity are preferably added in an amount ranging from about 0.05 to about 2.5 pph based upon 100 parts of polybutadiene, or polybutadiene mixed with one or more other elastomeric polymers. More preferably, the amount of scorch retarding peroxide added ranges from about 0.15 to about 2 pph and, most preferably, from about 0.25 to about 1.5 pph.

The cross-linking agent is preferably added in an amount ranging from about 8 pph to about 60 pph based upon 100 parts of polybutadiene, or polybutadiene mixed with one or more other elastomeric polymers. More preferably, the amount of cross-linking agent added ranges from about 10 pph to about 40 pph.

The compositions of the present invention may also include at least one particulate material, added to the elastomeric composition to adjust the density and/or specific gravity of the core. As used herein, the term "particulate material" includes any compound or composition that can be used to vary the density and other properties of the subject golf ball composition. Particulate materials useful in the golf ball compositions of the present invention include, for example, zinc oxide, tin oxide, calcium oxide, barium sulfate, such as POLYWATE 325®, and regrind (which is recycled core molding composition ground to 30 mesh particle size). The amount and type of particulate material utilized is governed by the amount and weight of other ingredients in the composition, since a maximum golf ball weight of 1.620 ounces (45.92 g) has been established by the United States Golf Association (hereafter "USGA"). Appropriate particulate materials generally used range in specific gravity from about 2.0 to about 5.6. The particulate material is generally added in an amount ranging from about 5 pph to about 70 pph by weight based upon 100 parts of elastomeric polymer. Preferably, the amount of particulate material added ranges from about 10 pph to about 50 pph.

Golf ball compositions made according to the present invention can be of any specific gravity which can be used in a golf ball. The preferred range of specific gravities of the present invention is from about 0.9 to about 1.5 or more, more preferably in the range of from about 1 to about 1.3, depending upon the size of the finished ball and the size and specific gravity of the core and, when present, of intermediate layer(s) and the cover.

Antioxidants may also be included in the scorch retarding compositions produced according to the present invention. Antioxidants are compounds which prevent the breakdown of the elastomeric polymer. Antioxidants useful in the present invention include, but are not limited to, quinoline type antioxidants, amine type antioxidants and phenolic type antioxidants.

Other ingredients, such as processing aids, processing oils, plasticizers, dyes and pigments, as well as other additives well known to the skilled artisan may also be used in the present invention in amounts sufficient to achieve the purpose for which they are typically used.

The compositions of the invention are typically produced by forming a mixture comprising at least one elastomeric polymer, e.g., polybutadiene, at least one cross-linking agent, e.g., zinc diacrylate, and at least one particulate material, e.g., zinc oxide and/or tin oxide and, optionally, one or more additional components, such as additives. In particular, as these components are mixed, the resultant shear causes the temperature of the mixture to rise. When a set of predetermined conditions is met, i.e., time and temperature of mixing, the scorch retarding free radical initiator, e.g., a scorch retarding peroxide, is added for crosslinking purposes during the molding process in an amount dependent upon the amounts and relative ratios of the starting components.

After completion of the mixing, the golf ball composition is milled with a roll mill and formed by hand into pieces, commonly known as "preps", suitable for molding. As an alternative to milling, the composition may be extruded into preps. The preps are then compression molded into golf ball components at an elevated temperature. For example, 160° C. (320° F.) for 15 minutes is generally suitable for forming cores. These cores can then be used to make finished golf balls, e.g., by surrounding the cores with standard cover materials.

Preferably, the cover stock used to make a golf ball in accordance with the present invention comprises at least one ionomer resin. Alternatively, the cover stock may be formed from a blend of ionomer resins. Blending of the ionomer resins is accomplished by combining the polymer components by any method familiar to those in the polymer blending art, for example, with a twin-screw extruder or barrel mixing. The twin screw extruder may be of the counter-rotating non-intermeshing, co-rotating non-intermeshing, counter-rotating fully intermeshing or co-rotating fully intermeshing type.

Conventional equipment used in the production of golf balls may be used to form the golf balls of the invention in a manner well known to those skilled in the art. Good results for producing golf ball covers have been obtained by mixing the desired ionomer resins in a solid, pelletized form and then placing the mix into a hopper which is used to feed the heated barrel of an injection molding machine. Further mixing is accomplished by a screw within the heated injection molder barrel. The injection molding machine is used either to make preformed half-shells, subsequently compression molded over the cores of the invention, e.g., in a ball mold, or to directly mold the cover about the core, e.g., in a retractable-pin mold. Such molds and machines are conventional.

After molding, golf balls comprising the golf ball compositions of the invention can be finished by buffing, painting and stamping.

The properties such as hardness, modulus, core diameter, intermediate layer thickness and cover layer thickness of the golf balls of the present invention have been found to effect play characteristics such as durability, spin, initial velocity and feel of the present golf balls.

In particular, the diameter of the core of the present invention is from about 1.00 inches to about 1.63 inches. Preferably the diameter of the core is from about 1.00 inches to about 1.59 inches. When at least one intermediate layer is present, the diameter of the core is preferably from about 1.00 inches to about 1.45 inches. The thickness of an intermediate layer of the invention, when present, is from about 0.02 inches to about 0.3 inches. Preferably, the thickness of the intermediate layer is from about 0.03 inches to about 0.3 inches. Most preferably, the thickness of the intermediate layer is from about 0.06 inches to about 0.3 inches. Furthermore, the thickness of the cover layer of the present invention is from about 0.015 inches to about 0.13 inches. Preferably, the thickness of the cover layer is from about 0.03 inches to about 0.11 inches. Most preferably, the thickness of the cover layer is from about 0.04 inches to about 0.10 inches. Preferably, the overall diameter of the core and all intermediate layers is from about 80% to about 98% of the overall diameter of the finished ball, and is preferably from about 1.68 inches to about 1.78 inches.

The present golf ball comprising a core formed from the scorch retarding composition of the present invention can have an overall diameter of any size. Although the USGA Rules of Golf limit the minimum size of a competition golf ball to 1.68 inches in diameter, there is no specification as to the maximum diameter. Moreover, golf balls of any size can be used for recreational play. The preferred diameter of the present golf balls is from about 1.68 inches to about 1.80 inches. The more preferred diameter is from about 1.68 inches to about 1.76 inches. The most preferred diameter is from about 1.68 inches to about 1.74 inches.

Several physical properties such as hardness and modulus of the various layers of the golf balls of the present invention are believed to impact the playing characteristics of such golf balls. For example, the flexural and/or tensile modulus of the intermediate layer are believed to have an effect on the "feel" of the golf balls of the present invention. Accordingly, when the golf balls of the present invention have an intermediate layer, it is preferable that the flexural modulus of this layer is from about 500 psi to about 500,000 psi. More preferably, the flexural modulus of the intermediate layer is from about 1,000 psi to about 250,000 psi. Most preferably, the flexural modulus of the intermediate layer is from about 2,000 psi to about 200,000 psi.

Similarly, it is preferable that the golf balls of the present invention have a cover layer with a flexural modulus from about 10,000 psi to about 150,000 psi. More preferably, the flexural modulus of the cover layer is from about 15,000 psi to about 120,000 psi. Most preferably, the flexural modulus of the cover layer is from about 18,000 psi to about 110,000 psi.

The golf ball compositions of the present invention have a core hardness from about 50 Shore A to about 90 Shore D. Preferably, the core has a Shore D hardness from about 30 to about 80. More preferably, the core has a Shore D hardness from about 35 to about 75. Any intermediate layer present in the golf balls of the present invention preferably has a hardness of from about 60 Shore A to about 85 Shore D. More preferably, the hardness of an intermediate layer is from about 65 Shore A to about 80 Shore D. The cover layer of the golf balls of the present invention preferably has a Shore D hardness from about 40 to about 90. More preferably, the Shore D hardness of the cover layer is from about 45 to about 85. Most preferably, the cover layer has a Shore D hardness from about 50 to about 80.

Unless otherwise noted, all percent and parts values given herein are by weight, i.e., weight percent (wt. %) and parts by weight.

EXAMPLES

These and other aspects of the present invention may be more fully understood with reference to the following non-limiting examples, which are merely illustrative of the preferred embodiments of the present invention, and are not to be construed as limiting the invention, the scope of which is defined by the appended claims.

The results obtained with golf ball cores and golf balls prepared according to the following examples are representative of the improved performance characteristics of golf ball cores and golf balls made from the compositions of this invention. The compositions used to prepare the golf balls of these examples contained the ingredients listed in Table 2 in the specified amounts, which are all in parts per hundred by weight (pph), based on 100 parts of elastomeric polymer, i.e., polybutadiene or elastomeric polymer blends comprising polybutadiene. The cross-linking agent used in each example composition is zinc diacrylate. The particulate materials used in the compositions of these examples are zinc oxide, tin oxide, POLYWATE 325® or mixtures thereof. VAROX DCP-R® and VAROX 802-40KE-HP® are scorch retarding peroxide free radical initiators used in Examples 1–4. VAROX 231XL® and VULCUP® 40KE are conventional peroxide free radical initiators used in the control examples, i.e., Examples 5C and 6C. Small amounts of various pigments were used to color each composition for identification purposes.

The amount of peroxide required for each example formulation was back-calculated by determining the amount of active oxygen known to perform successfully in a mixed peroxide formulation and then using this value and the amount of active oxygen for each of the peroxides of the examples to determine its target concentration, in pph, for each example composition. Table 1 below summarizes this calculation.

TABLE 1

| Peroxide Target Concentration Calculation | | | |
|---|---|---|---|
| Mixed Peroxide | Concentration (pph) | Active Oxygen (%) | Concentration Active Oxygen |
| VAROX 231XL | 0.42 | 4.24 | 1.7808 |
| VULCUP 40KE | 0.23 | 3.83 | 0.8809 |
| | | Total | 2.6617 |
| Example Peroxide | Purity (%) | Active Oxygen (%) | Taget Concentration (pph) |
| VAROX 231XL | 40 | 4.24 | 0.63 |
| VULCUP 4OKE | 40 | 3.83 | 0.69 |
| VAROX DCP-R | 99 | 5.86 | 0.45 |
| VAROX 802-40KE-HP | 35 | 3.30 | 0.81 |

All the ingredients except the peroxides were mixed in a 350 g capacity Process Lab Brabender mixer to 82.2–93.3°

C. (180–200° F.). The peroxides were added in the second stage to the initial mixture, and the resulting admixture was removed from the Brabender and blended on a lab roll mill to insure homogeneity.

Samples of each admixture were analyzed with a Monsanto MDR2000 pressurized-cavity rotorless moving die rheometer using a frequency of 1.7 Hz and at a 0.2° arc to determine their scorch time. This standard technique is well-known to those of ordinary skill in the art of making golf ball compositions and golf balls. This rheometer applies an oscillating strain to the admixture at a substantially constant temperature and determines the torque response as a function of time. Generally, torque increases as the amount of cross-linking increases until a steady-state torque value is reached, indicating that the admixture undergoes no further cross-linking. Typically, each determination was stopped after about 30 minutes. For the purposes of this application, the scorch time is defined as the amount of time required for the admixture to reach 2% of the steady torque value, each determination being conducted at the "optimum temperature" as defined below.

The MDR2000 rheometer was used as described above to determine the "optimum temperature", i.e., the temperature at which each admixture would reach a torque value of 90% of the steady torque value within 11 to 12 minutes. This temperature was determined so that each peroxide could be compared on the same basis, i.e., to allow each peroxide the same amount of time to produce free radicals to react with the composition.

To fabricate the innermost cores, after mixing, the admixture was then hand rolled using a laboratory mill and cut into pieces or "preps". These preps were then compression molded for 15 minutes at an "optimum temperature" determined as described above to form a batch of five cores of 1.15 inches in diameter. Each inner core was covered with the same outer core composition of polybutadiene, zinc diacrylate and a peroxide to achieve an overall outermost diameter of 1.58 inches for each sample.

To fabricate the finished golf balls, an injection molding machine was used to make preformed half-shells from the same SURLYN® ionomer blend for each sample. The (inner+outer) core assembly was inserted into two cover half-shells which were compression molded over the assembly in a ball mold to form each golf ball.

The cores and balls prepared according to the above-described method were tested for their coefficient of restitution (hereafter "COR"). COR is evaluated by shooting a golf ball out of an air cannon at a steel plate. COR is calculated by dividing the rebound velocity of the golf ball by the incoming velocity. Thus, a ball with a high coefficient of restitution dissipates a smaller fraction of its total energy when colliding with the plate and rebounding therefrom than does a ball with a low coefficient of restitution. COR testing is conducted over a range of incoming velocities and determined at an inbound velocity of 125 ft/s.

Golf balls prepared according to the above-described method were tested for their compression and durability; the results are summarized in Table 2. Both of these standard measurement techniques, well-known to those of ordinary skill in the art of making golf ball cores and balls, are described briefly below.

Compression was measured by applying a spring-loaded force to the golf ball with a manual instrument (an "Atti gauge") manufactured by the Atti Engineering company of Union City, N.J. This machine, equipped with a Federal Dial Gauge, Model D81-C, employs a calibrated spring under a known load. The apparatus measures the deflection of the calibrated spring relative to the deflection of a golf ball. Each golf ball tested was forced a distance of 0.2 inch (5 mm) against this spring. If the spring, in turn, compressed the maximum 0.2 inch, the golf ball compression was rated at 100; if the spring compressed only 0.1 inch, the compression value was rated as 0. Thus, more compressible, softer balls will have lower compression values than harder, less compressible, balls. Compression measured with this instrument is also sometimes referred to as PGA compression.

Each golf ball batch was tested for durability using a Titleist-made Rotating Pendulum Testing Machine. The machine, rotating at 1100 rpm, was configured to repeatedly strike the golf balls with a grooved metal face-plate placed 13.5 inches from the drive motor and angled at approximately 13°. The balls were evaluated as they were repeatedly struck. The testing cycle continued until at least 50% of the balls failed.

TABLE 2

| | Example Number | | | | | |
|---|---|---|---|---|---|---|
| | 1 | 2 | 3 | 4 | 5C | 6C |
| Core Ingredients (parts by weight) | | | | | | |
| SHELL 1220 cis-1,4-Polybutadiene | 100 | 100 | 100 | 80 | 100 | 100 |
| BR40 cis-1,4-Polybutadiene | — | — | — | 20 | — | — |
| Zinc Diacrylate | 12 | 12 | 12 | 25 | 12 | 12 |
| Zinc Oxide | 29 | — | 29 | 5 | 29 | — |
| Tin Oxide | — | 29 | — | — | — | 29 |
| POLYWATE 325 | — | — | — | 19 | — | — |
| VAROX 802-40KE-HP[a] | 0.81 | 0.81 | — | 0.81 | — | — |
| VAROX DCP-R[a] | — | — | 0.45 | — | — | — |
| VAROX 231XL[b] | — | — | — | — | 0.42 | 0.42 |
| VULCUP 40KE[b] | — | — | — | — | 0.15 | 0.15 |
| Pigment[c] | 0.25 | 0.25 | 0.25 | 0.25 | 0.25 | 0.25 |
| Core Formation | | | | | | |
| Molding Temperature (° F.) | 345 | 345 | 340 | 348 | 340 | 340 |
| Molding Time (min) | 15 | 15 | 15 | 15 | 15 | 15 |
| Scorch Time (sec) | 63 | 63 | 45 | 58 | 20 | 19 |
| Mold Ejectability | Good | Good | Fair | Good | Difficult | Difficult |

TABLE 2-continued

| | Example Number | | | | | |
|---|---|---|---|---|---|---|
| | 1 | 2 | 3 | 4 | 5C | 6C |
| Core Properties | | | | | | |
| Surface Hardness, Shore D | 24 | 24 | 25 | 44 | 24 | 25 |
| COR | 0.712 | 0.714 | 0.732 | 0.780 | 0.727 | 0.730 |
| Specific Gravity | 1.26 | 1.16 | 1.26 | 1.14 | 1.26 | 1.16 |
| Golf Ball Properties[d] | | | | | | |
| Compression | 57 | 50 | f | f | 58 | 57 |
| COR | 0.774 | 0.769 | f | f | 0.773 | 0.776 |
| Durability[e] | 200 | 145 | f | f | 150 | 75 |

[a]Scorch retarding peroxide
[b]Standard peroxide
[c]Present to identify various core compositions by color
[d]Intermediate layer for all balls formed from polybutadiene/zinc diacrylate/peroxide, specific gravity is 1.10 for Example Nos. 1 and 5C, 1.16 for Example Nos. 2 and 6C; cover for all balls formed from 30 wt. % VLMI (Very Low Modulus Ionomer)/70 wt. % conventional ionomer blend
[e]Number of hits before 50% of tested balls fail
[f]No golf balls were made from these cores. Based on the properties of the cores, the properties of such golf balls should be acceptable.

As shown above in Table 2, using the scorch retarding peroxide VAROX 802-40KE-HP in Example 1 increases the scorch time by 315%, to 63 sec from 20 sec, as compared to control Example 5C, which is identical to the Example 1 composition except that the conventional peroxide VAROX 231XL is used in Example 5C in place of a scorch retarding peroxide. Moreover, it was difficult to remove golf ball cores formed from the Example 5C composition, comprising conventional peroxide, from the mold. In contrast, golf ball cores formed from the scorch retarding Example 1 composition were readily removed from the mold. Moreover, in the cores formed from Example 1, backrinding was substantially reduced, if not eliminated, upon removal from the mold unlike the cores formed from the Example 5C, which exhibited pronounced backrinding.

In addition, the durability of golf balls formed from cores comprising the scorch retarding Example 1 composition, .200 hits, is improved over the durability of golf balls formed from cores comprising the control composition comprising the conventional peroxide of Example 5C, which allowed for only 150 hits.

As also illustrated by Table 2, the scorch retarding composition comprising peroxide VAROX 802-40KE-HP in Example 2 with a tin oxide particulate material, as opposed to the zinc oxide of Example 1, has desirable properties even in the absence of zinc oxide particulate material. For example, golf balls formed from core compositions comprising this scorch retarding peroxide and tin oxide have increased durability, by 193%, when compared to the durability of golf balls formed from cores comprising the control composition of Example 6C, the durability tests yielding results of 145 hits as compared to 75 hits, respectively. The Example 6C composition is identical to the Example 2 composition except that the conventional peroxide VAROX 231XL is used in Example 6C in place of a scorch retarding peroxide. Moreover, in the cores formed from Example 2, backrinding was substantially reduced, if not eliminated, upon removal from the mold unlike the cores formed from the Example 6C, which exhibited pronounced backrinding.

Example 3 shows that cores can be readily produced from a composition comprising the scorch retarding peroxide VAROX DCP-R. Such cores are more easily removed from the mold when compared to cores formed from a composition comprising a conventional peroxide, e.g., Example 5C. Moreover, using the scorch retarding peroxide of Example 3 increases the scorch time by 225%, to 45 sec from 20 sec, as compared to control Example 5C, which is identical to the Example 3 composition except that the conventional peroxide VAROX 231XL is used in Example 5C in place of a scorch retarding peroxide. Moreover, in the cores formed from Example 3, backrinding was substantially reduced, if not eliminated, upon removal from the mold unlike the cores formed from the Example 5C, which exhibited pronounced backrinding.

Example 4 illustrates that golf ball cores can be formed from a composition comprising a mixture of polybutadiene rubbers. In fact, the COR of such mixed polybutadiene cores, 0.780, is the highest of any of the examples in Table 2 and indicates that such cores dissipate a smaller fraction of their total energy in a collision than any of the other golf ball cored tested. High COR is, generally, a desirable attribute of golf ball compositions.

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

What is claimed is:

1. A golf ball comprising a cover layer, a core layer, and optionally, at least one intermediate layer interposed between the cover layer and the core, wherein at least one said layer is molded from a scorch retarding composition, said composition comprising a scorch retarding peroxide, an elastomeric polymer, a cross-linking agent, and at least one of 2,3,5,6-tetramethylbenzoquinone, 2,6-di-t-butyl-4-hydroxybenzaldehyde, 2,6-di-t-butyl-4-methylene-2,5-cyclohexane-1-one, and mixtures thereof.

2. The golf ball of claim 1, wherein said core layer is molded of said scorch retarding composition.

3. The golf ball of claim 1, wherein said at least one said intermediate layer is molded of said scorch retarding composition.

4. The golf ball of claim 1, wherein said scorch retarding peroxide is present in said at least one layer molded from said scorch retarding composition in an amount sufficient to delay cross-linking of said elastomeric polymer during formation of said at least one layer for a time sufficient to substantially prevent backrinding therein.

5. The golf ball of claim 1, wherein the scorch retarding peroxide comprises at least one of α,α'-bis(t-butylperoxy)- diisopropylbenzene, 2,5-dimethyl-2,5-di(t-butylperoxy) hexane, and mixtures thereof.

6. The golf ball of claim 1, wherein the amount of the scorch retarding peroxide in said composition is from about 0.05 parts to about 6.0 parts per 100 parts of said elastomeric polymer by weight.

7. The golf ball of claim 6, wherein the amount of the scorch retarding peroxide in said composition is from about 0.05 parts to about 2.5 parts per 100 parts of said elastomeric polymer by weight.

8. The golf ball of claim 7, wherein the amount of scorch retarding peroxide in said composition is from about 0.15 parts to about 2 parts per 100 parts of said elastomeric polymer by weight.

9. The golf ball of claim 1, wherein the scorch retarding composition comprises 2,3,5,6-tetramethylbenzoquinone.

10. The golf ball of claim 9, wherein the amount of the free radical scavenger in said scorch retarding peroxide is from about 0.01 parts to about 2 parts per 100 parts of the peroxide by weight.

11. The golf ball of claim 10, wherein the amount of the free radical scavenger in said scorch retarding peroxide is from about 0.1 parts to about 1.3 parts per 100 parts of the peroxide by weight.

12. The golf ball of claim 1, wherein the scorch retarding composition comprises 2,6-di-t-butyl-4-methylene-2,5-cyclohexane-1-one.

13. The golf ball of claim 1, wherein the elastomeric polymer comprises polybutadiene.

14. The golf ball of claim 13, wherein the polybutadiene has a cis-1,4-polybutadiene content of at least about 80%.

15. The golf ball of claim 13, wherein the polybutadiene has a cis-1,4-polybutadiene content of at least about 90%.

16. The golf ball of claim 1, wherein the cross-linking agent is a metal salt of a material selected from the group consisting of mono-(meth)acrylic acid, di-(meth)acrylic acid, and mixtures thereof.

17. The golf ball of claim 16, wherein the metal salt in said composition is present in an amount of from about 8 parts to about 60 parts per 100 parts of said elastomeric polymer by weight.

18. The golf ball of claim 17, wherein the amount of the metal salt in said composition is from about 10 parts to about 40 parts per 100 parts of said elastomeric polymer by weight.

19. The golf ball of claim 17, wherein the metal salt is zinc diacrylate.

20. The golf ball of claim 1, wherein the composition further comprises a particulate material selected from the group consisting of zinc oxide, tin oxide, calcium oxide, barium sulfate, regrind, and mixtures thereof.

21. A golf ball comprising a cover, a core and, optionally, at least one intermediate layer interposed between the cover and the core, wherein the core is formed from a scorch retarding composition, said composition comprising an elastomeric polymer comprising polybutadiene, from about 0.05 parts to about 6.0 parts per 100 parts of said elastomeric polymer by weight of a scorch retarding peroxide selected from the group consisting of α,α'-bis(t-butylperoxy)-diisopropylbenzene, 2,5-dimethyl-2,5-di(t-butylperoxy) hexane, and mixtures thereof, one or more of 2,3,5,6-tetramethylbenzoquinone, 2,6-di-t-butyl-4-hydroxybenzaldehyde, 2,6-di-t-butyl-4-methylene-2,5-cyclohexane-1-one, or mixtures thereof, and a cross-linking agent comprising a metal salt of a material selected from the group consisting of mono-(meth)acrylic acid, di-(meth) acrylic acid, and mixtures thereof.

22. The golf ball of claim 21, wherein the scorch retarding peroxide is present in said composition in an amount of from about 0.05 parts to about 2.5 parts per 100 parts of said elastomeric polymer by weight.

23. The golf ball of claim 22, wherein the amount of the scorch retarding peroxide in said composition is from about 0.15 parts to about 2 parts per 100 parts of said elastomeric polymer by weight.

24. The golf ball of claim 21, wherein the polybutadiene has a cis-1,4-polybutadiene content of at least about 90%.

25. The golf ball of claim 21, wherein the metal salt is zinc diacrylate.

26. A method of manufacturing a golf ball having improved resistance to backrinding, said ball comprising a cover layer having a flexural modulus of about 10,000 psi to 150,000 psi, a core layer, and, optionally, at least one intermediate layer interposed between the cover layer and the core layer, which method comprises:

forming a first mixture comprising an elastomeric polymer and from about 8 parts to about 60 parts per 100 parts of said elastomeric polymer by weight of a cross-linking agent comprising a metal salt of a material selected from the group consisting of mono-(meth) acrylic acid, di-(meth)acrylic acid, and mixtures thereof, wherein the elastomeric polymer comprises polybutadiene;

combining from about 0.05 parts to about 6.0 parts per 100 parts of said elastomeric polymer by weight of at least one scorch retarding peroxide and one or more of 2,3,5,6-tetramethylbenzoquinone, 2,6-di-t-butyl-4-hydroxybenzaldehyde, 2,6-di-t-butyl-4-methylene-2,5-cyclohexane-1-one, or mixtures thereof, with the first mixture to form a scorch retarding golf ball composition; and forming at least one said layer of a golf ball from the composition.

27. The method of claim 26, wherein the first mixture is formed with the cross-linking agent in an amount of from about 10 parts to about 40 parts per 100 parts of said elastomeric polymer by weight.

28. The method of claim 26, further comprising forming the first mixture with polybutadiene having a cis-1,4-polybutadiene content of at least about 90%.

29. The method of claim 26, wherein the scorch retarding peroxide is added to said first mixture in an amount of from about 0.05 parts to about 2.5 parts per 100 parts of said elastomeric polymer by weight.

30. The method of claim 26, wherein said scorch retarding peroxide comprises a compound selected from the group consisting of α,α'-bis(t-butylperoxy)-diisopropylbenzene, 2,5-dimethyl-2,5-di(t-butylperoxy)hexane, and mixtures thereof.

31. The method of claim 30 wherein one scorch retarding peroxide and 2,6-di-t-butyl-4-hydroxybenzaldehyde are combined with the first mixture to form a scorch retarding golf ball composition.

32. The method of claim 26, further comprising forming the first mixture with zinc diacrylate as the metal salt.

33. The method of claim 26, further comprising adding to said first mixture a particulate material selected from the group consisting of zinc oxide, tin oxide, calcium oxide, barium sulfate, regrind, and mixtures thereof.

34. A golf ball comprising a cover layer, a core layer, and optionally, at least one intermediate layer interposed between the cover layer and the core, wherein at least one said layer is molded from a scorch retarding composition, said composition comprising: a scorch retarding peroxide, an elastomeric polymer, a cross-linking agent, and a benzoquinone.

* * * * *